UNITED STATES PATENT OFFICE.

JOHN SMITH, OF VERONA, PENNSYLVANIA.

MOLDER'S CORE.

SPECIFICATION forming part of Letters Patent No. 575,074, dated January 12, 1897.

Application filed June 4, 1896. Serial No. 594,340. (No model.)

*To all whom it may concern:*

Be it known that I, JOHN SMITH, a resident of Verona, in the county of Allegheny and State of Pennsylvania, have invented a new and useful Improvement in Cores; and I do hereby declare the following to be a full, clear, and exact description thereof.

My invention relates to cores such as are employed in the casting of hollow articles of iron, brass, or other metals. Many different compositions have been employed for the manufacture of these cores, but practically all of them require to be baked before they can be used. This baking causes the cores to shrink and fall away, so that it is practically impossible to produce cores of accurate and uniform dimensions. Again, most of the cores now employed contain certain ingredients which, when brought into contact with the molten metal, form gases. These gases escaping from the core form blow-holes and defects in the casting, so that many defective castings result from this cause. There are other difficulties involved in the use of the cores at present in use which it is not necessary to enumerate.

The object of my invention is to provide a strong, durable core which does not need to be baked, and which can be formed of accurate and uniform dimensions, while at the same time no gases are emitted from it during the casting operation.

My improved cores consist of a composition of any hydraulic cement and sand mixed with sticky fluid, or other suitable liquid which has the property of holding the particles of cement and sand together. The proportions of cement and sand may be varied to suit the different metals with which they are to be used. For ordinary iron castings the proper proportions are approximately one pound of cement to ten pounds of sand. Some metals, however, require a denser core than others and accordingly the amount of cement may be varied.

The cement and sand mixed in the proper proportions and brought to the proper consistency by any sticky fluid, such as molasses-water, is then introduced into suitable core-boxes and molded to the desired form, or, if desired, the sand and cement may be mixed together and sprinkled with water until the composition is moist enough for molding. If the sand itself is wet and then mixed with the cement, the composition can be molded into cores. The cores are then removed from the core-boxes and are allowed to dry, no baking being required. The cores may be exposed to the sun or set on trays in a warm room until they are thoroughly dried, when they are ready for use.

I can employ Portland cement, Louisville cement, or any other hydraulic cement of the same character which will set quickly.

I employ the word "sand" throughout the specification and claims in its broad sense, as set forth in the definition of it as given in *Worcester's Dictionary:* "Small particles or grains of quartz, or other minerals, not cohering together; particles or grains arising from the breaking or crumbling of stone." Coke-dust, pulverized bricks, and loam may be used and are included within the broad definition of "sand."

By practical experience I have proven that cores composed of hydraulic cement and sand become hard and durable without being baked. This of itself is a great advantage, as it saves the use of great furnaces for the baking of the cores and the fuel required to heat same. Furthermore, the cores do not shrink or fall away after they are made. They can be made of accurate and uniform dimensions, so that the castings made therefrom are likewise uniform in size. They do not emit any gases to injure the metal.

What I claim as my invention, and desire to secure by Letters Patent, is—

1. As a new article of manufacture, a core composed of any hydraulic cement and sand in proper proportions, substantially as set forth.

2. As a new article of manufacture, a core composed of any hydraulic cement and sand in proper proportions, and a sticky fluid to unite the same, substantially as set forth.

In testimony whereof I, the said JOHN SMITH, have hereunto set my hand.

JOHN SMITH.

Witnesses:
ROBT. D. TOTTEN,
ROBERT C. TOTTEN.